US012634545B2

(12) United States Patent
Balasubramanian et al.

(10) Patent No.: US 12,634,545 B2
(45) Date of Patent: May 19, 2026

(54) SEAMLESS AUDIO AND VIDEO TRANSITION

(71) Applicant: Thomson Licensing, Cesson-Sevigne (FR)

(72) Inventors: Sundaramoorthy Balasubramanian, Horsham, PA (US); Baskaran Kandasamy, Horsham, PA (US)

(73) Assignee: Thomson Licensing, Cesson-Sevigne (FR)

( * ) Notice: Subject to any disclaimer, the term of this patent is extended or adjusted under 35 U.S.C. 154(b) by 0 days.

(21) Appl. No.: 19/099,170

(22) PCT Filed: Aug. 1, 2023

(86) PCT No.: PCT/US2023/029182
§ 371 (c)(1),
(2) Date: Jan. 28, 2025

(87) PCT Pub. No.: WO2024/030412
PCT Pub. Date: Feb. 8, 2024

(65) Prior Publication Data
US 2026/0046468 A1 Feb. 12, 2026

Related U.S. Application Data

(60) Provisional application No. 63/395,458, filed on Aug. 5, 2022.

(51) Int. Cl.
*H04N 21/439* (2011.01)
*H04N 21/426* (2011.01)
(Continued)

(52) U.S. Cl.
CPC ... *H04N 21/42615* (2013.01); *H04N 21/4341* (2013.01); *H04N 21/4392* (2013.01); *H04N 21/443* (2013.01)

(58) Field of Classification Search
CPC ...................... H04N 21/4392; H04N 21/4341
See application file for complete search history.

(56) References Cited

U.S. PATENT DOCUMENTS

2006/0126488 A1 6/2006 Kang
2013/0279877 A1 10/2013 Boak
(Continued)

OTHER PUBLICATIONS

International Search Report and the Written Opinion of the International Searching Authority dated Oct. 23, 2023.
(Continued)

*Primary Examiner* — Michael H Hong
(74) *Attorney, Agent, or Firm* — James Shead; David Todd Shoneman; Michael A. Pugel

(57) ABSTRACT

A media device provides seamless transitioning between a plurality of media applications. A selection of a second media application can cause the media device to switch from a first media application to the second media application so as to cause the display of second content associated with the second media application without significant interruption in the viewing experience of a user. A silent audio buffer associated with the first content associated with the first media application can be generated while a first video output surface associated with the first content is muted and processed in the background. By writing a silent audio buffer and processing the muted first video output surface in the background, the video output stream and audio output stream are provided to an output device without causing a black screen and/or mixed audio to be presented.

20 Claims, 4 Drawing Sheets

(51) Int. Cl.
_H04N 21/434_ (2011.01)
_H04N 21/443_ (2011.01)

(56) References Cited

U.S. PATENT DOCUMENTS

2017/0280204 A1    9/2017  Liu et al.
2022/0130320 A1    4/2022  Han et al.
2024/0334005 A1*  10/2024  Ma ......................... A63F 13/86

OTHER PUBLICATIONS

International Preliminary Report on Patentability dated Feb. 4, 2025 in International (PCT) Application No. PCT/US2023/029182.

* cited by examiner

MEDIA DEVICE
160

OUTPUT
DEVICE
102

NETWORK
INTERFACE
104

POWER
SUPPLY
106

CONTROLLER
108

MEMORY
110

USER
INTERFACE
114

SOFTWARE
112

MEDIA
APPLICATION
120A

·
·
·

MEDIA
APPLICATION
120N

105

NETWORK
RESOURCE

CONTENT
170A

CONTENT
170B

150

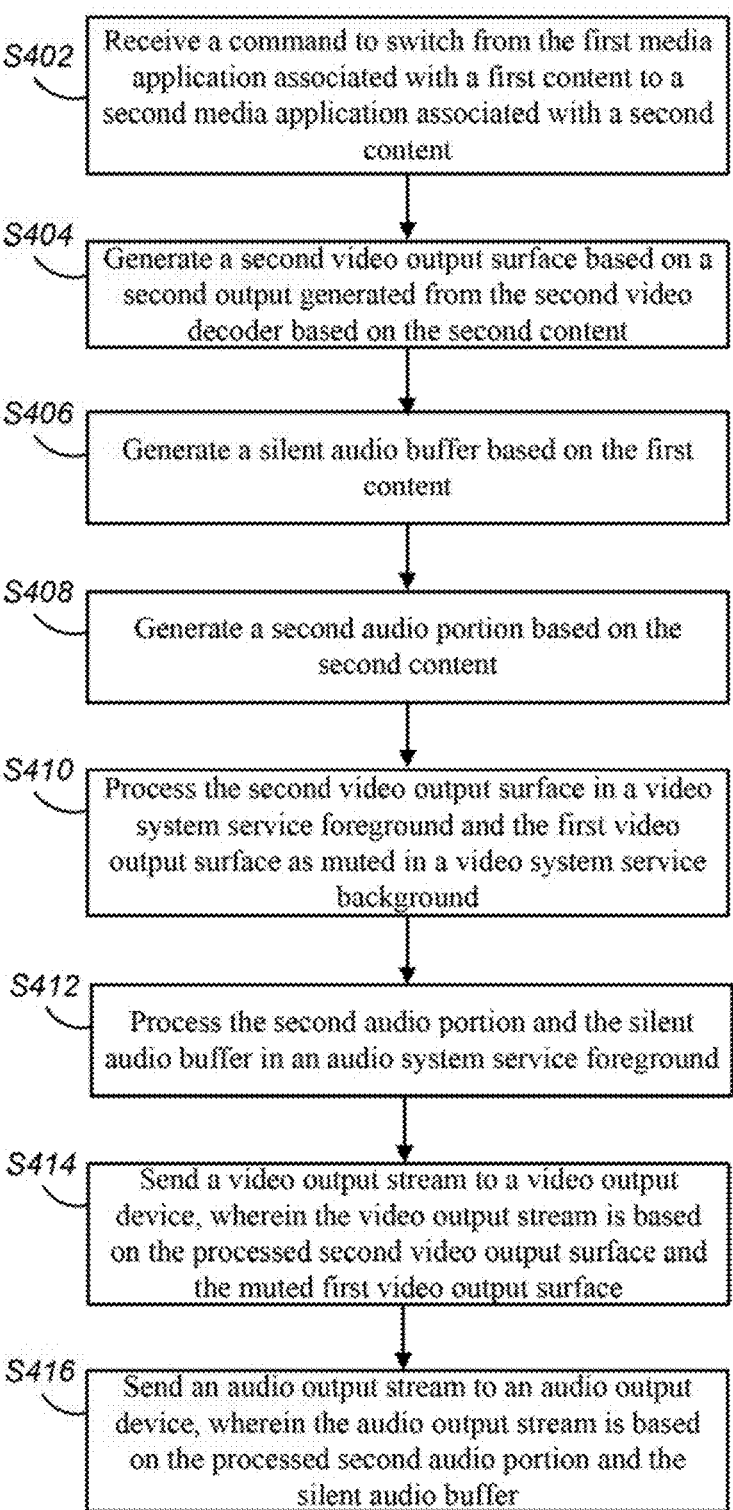

S402 — Receive a command to switch from the first media application associated with a first content to a second media application associated with a second content S404 — Generate a second video output surface based on a second output generated from the second video decoder based on the second content S406 — Generate a silent audio buffer based on the first content S408 — Generate a second audio portion based on the second content S410 — Process the second video output surface in a video system service foreground and the first video output surface as muted in a video system service background S412 — Process the second audio portion and the silent audio buffer in an audio system service foreground S414 — Send a video output stream to a video output device, wherein the video output stream is based on the processed second video output surface and the muted first video output surface S416 — Send an audio output stream to an audio output device, wherein the audio output stream is based on the processed second audio portion and the silent audio buffer

FIG. 4

SEAMLESS AUDIO AND VIDEO TRANSITION

BACKGROUND

Users are increasingly expecting that a media device provide the capability to playback content from various sources. A user selects between various applications associated with the playback of content. However, switching between these applications is not seamless. There is a need for a seamless audio and video transition when switching between applications associated with the playback of media so as to provide an improved quality of experience (QoE) for the user.

SUMMARY

According to aspects of the present disclosure there are provided novel solutions for seamless audio and video transition when a user selects a different application for the playback of a media.

An aspect of the present disclosure provides a media device for switching from a first media application to a second media application. The media device comprising a memory storing one or more computer-readable instructions and a processor configured to execute the one or more computer-readable instructions to perform one or more operations to receive a command to switch from the first media application associated with a first content to a second media application associated with a second content, and switch from the first media application to the second media application based on the command, wherein the switching comprises generating a second video output surface based on the second content, generate a silent audio buffer based on the first content, generating a second audio portion based on the second content, processing the second video output surface in a video system service foreground and the first video output surface as muted in a video system service background, processing the second audio portion and the silent audio buffer in an audio system service foreground, sending a video output stream to a video output device, wherein the video output stream is based on the processed second video output surface and the muted first video output surface, and sending an audio output stream to an audio output device, wherein the audio output stream is based on the processed second audio portion and the silent audio buffer.

In an aspect of the present disclosure, the switching further comprises sending the second content to a second video decoder associated with the second media application, wherein the second video decoder outputs a second output based on the second content, generating the second video output surface based on the second output of the second video decoder.

In an aspect of the present disclosure, the switching further comprises sending the second content to a second audio decoder associated with the second media application, wherein the second audio decoder generates the second audio portion based on the second content.

In an aspect of the present disclosure, the switching further comprises sending a command to the first audio decoder associated with the first media application, wherein the first audio decoder generates the silent audio buffer based on the first content.

In an aspect of the present disclosure, wherein processing the second video output surface in a video system service foreground and the first video output surface as muted in a video system service background comprises applying mute to the first video output surface to generate the muted first video output surface.

In an aspect of the present disclosure, wherein generating the silent audio buffer comprises writing one or more zeroes to a buffer associated with the first content.

In an aspect of the present disclosure, wherein the silent audio buffer is generated by a first audio decoder associated with the first media application.

An aspect of the present disclosure provides a method for a media device to switch from a first media application to a second media application. The method comprises receiving a command to switch from the first media application associated with a first content to a second media application associated with a second content, and switching from the first media application to the second media application based on the command, wherein the switching comprises generating a second video output surface based on the second content, generating a silent audio buffer based on the first content, generating a second audio portion based on the second content, processing the second video output surface in a video system service foreground and the first video output surface as muted in a video system service background, processing the second audio portion and the silent audio buffer in an audio system service foreground, sending a video output stream to a video output device, wherein the video output stream is based on the processed second video output surface and the muted first video output surface, and sending an audio output stream to an audio output device, wherein the audio output stream is based on the processed second audio portion and the silent audio buffer.

In an aspect of the present disclosure, the method such that the switching further comprises sending the second content to a second video decoder associated with the second media application, wherein the second video decoder outputs a second output based on the second content and generating the second video output surface based on the second output of the second video decoder.

In an aspect of the present disclosure, the method such that the switching further comprises sending the second content to a second audio decoder associated with the second media application, wherein the second audio decoder generates the second audio portion based on the second content.

In an aspect of the present disclosure, the method such that the switching further comprises sending the first content to a first audio decoder associated with the first media application, wherein the first audio decoder generates the silent audio buffer based on the first content.

In an aspect of the present disclosure, processing the second video output surface in a video system service foreground and the first video output surface as muted in a video system service background comprises processing the second video output surface in a video system service foreground and the first video output surface as muted in a video system service background comprises.

In an aspect of the present disclosure, the method such that generating the silent audio buffer comprises writing one or more zeroes to a buffer associated with the first content.

In an aspect of the present disclosure, the method such that the silent audio buffer is generated by a first audio decoder associated with the first media application.

An aspect of the present disclosure provides a non-transitory computer-readable medium of a media device storing one or more instructions for providing switching from a first media application to a second media application. The one or more instructions when executed by a processor of the media device, cause the media device to perform one or more operations including the steps of the methods described above.

Thus, according to various aspects of the present disclosure described herein, it is possible to provide a seamless transition between media applications at a media device. In particular, the novel solution provides improvements to the display of content when transition between media applications.

BRIEF DESCRIPTION OF DRAWINGS

In the drawings, like reference numbers generally indicate identical, functionally similar, and/or structurally similar elements.

FIG. 4 illustrates a flow diagram of a method of transition between a first media application and a second media application at a media device, according to one or more aspects of the present disclosure.

DETAILED DESCRIPTION

Figure 1:
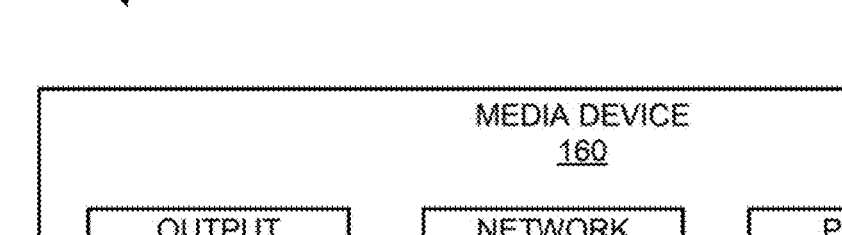
FIG. 1 is a schematic diagram of a media system, according to one or more aspects of the present disclosure.
Figure 1:
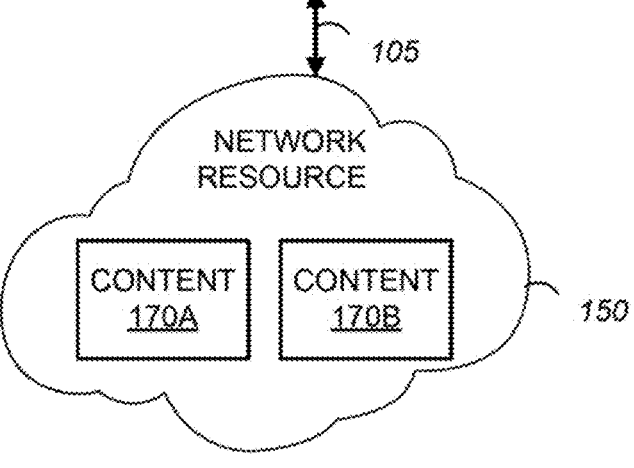

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Media devices are increasingly used by users to present content. Content can comprise any of audio content, video content, multi-media content, or any combination thereof. A media device can comprise any of a set-top box (STB), a customer premises equipment (CPE), an Internet of Things (IoT) device, a television, smart phone, any other Android media device, any other type of device capable of presenting content for display, any combination thereof. In some media devices, for example, a media device with an Android operating system, whenever a media application plays content, such as, content selected by a user, a surface is created for a video portion of the content and an audio track is created for the audio portion of the content. The created surface is mixed along with one or more other surfaces, such as a graphics surface, to present the video portion of the content at an video output device. The audio track is mixed by an audio mixer or audio system service, such as AudioFlinger, to render the audio portion of the content to an audio output device. The audio output device and the video output device can be a single device (such as a television) or distinct devices (such as a speaker and a display, respectively).

It is common for media devices to switch between various media applications. For example, a user may select a first media application for the playback of a first content and then switch to a different second media application for the playback of a second content. Generally, to accommodate switching between media applications on a media device, two options are available. A first option creates a new surface when a switch is made from a first media application to a second media application and the new surface is overlayed on top of the previous surface. Additionally, the new audio portion or track is created and is mixed. The first media application applies a mute on the associated previous surface and the associated previous audio track. However, in Android there are multiple audio streams, such as stream music, stream notification, etc. Applying any modification (such as a mute) in one stream impacts other streams even though all the streams are part of the same media application. Thus, during switching from the first media application to the second media application, the first media application mutes stream music but the second media application unmutes the same stream music resulting in the presentation of audio from associated with both the first media application and the second media application.

In a second option, when switching between a first media application to a second media application, a new surface is created that overlays on top of the previous surface associated with the first media application. A new audio track is created and mixed. The first media application has to stop and destroy the associated video pipeline and the associated audio pipeline. Thus, whenever a switch to a different media application occurs, the audio pipeline and the video pipeline must be destroyed which can require a few second resulting in the presentation of a black screen on the output device.

According to one or more novel aspects of the present disclosure, a media device can seamlessly switch between a first media application and a second media application by utilizing a mute feature and a silent audio buffer feature so as to provide a user with an improved QoE.

FIG. 1 is a schematic diagram of a media system 100, according to one or more aspects of the present disclosure. It should be appreciated that various example embodiments of inventive concepts disclosed herein are not limited to specific numbers or combinations of devices, and there may be one or multiple devices in the media system 100, which may itself consist of multiple communication networks and various known or future developed wireless connectivity technologies, protocols, devices, and the like. The media system 100 can include a media device 160 that can access, for example, receive, any content, such as a content 170A, a content 170B, etc., collectively referred to as content 170) from a network resource 150 via a connection 105.

The media device 160 can request content 170 from a network resource 150, for example, any of Netflix, Amazon Prime, Hulu, YouTube, any other provider of content, or any combination thereof. The media device 160 can include one or more elements including, but not limited to, any of an output device 102, a network interface 104, a power supply 106, a controller 108, a memory 110, a user interface 114, any other element, or any combination thereof. In one or more embodiments, content 170 is stored locally at the media device 160 in a memory 110, retrieved from a network resource 150 via a Bluetooth connection, a local area network (LAN) connection, a wide area network (WAN) connection, any other connection, or any combination thereof.

The output device 102 can comprise any device that provides for the playback and/or reproduction of content 170, such as any of audio content, video content, multimedia content, any other content, or any combination thereof. The output device 102 can comprise any of a speaker, a sound bar, a display (such as any of a television, a monitor, a projector, any other audio playback device, video playback device, or both, or any combination thereof), any other device that is capable of providing multi-media content for consumption by a user 180, or any combination thereof. In one or more embodiments, the media device 160 is coupled to an output device 102 that is external to the media device.

The network interface 104 can include, but is not limited to, various network cards, interfaces, and circuitry implemented in software and/or hardware to enable communications with a network resource 150, another media device 160, any other device (for example, a remote control, a keyboard, a mouse, a microphone, an audio/visual (A/V) device, any other user interface device, or any combination thereof), or any combination thereof using the communication protocol(s) in accordance with any connection, for example, connection 105.

The power supply 106 supplies power to any one or more of the internal elements of the media device 160, for example, through an internal bus. The power supply 106 can be a self-contained power source such as a battery pack with an interface to be powered through an electrical charger connected to an outlet (for example, either directly or by way of another device). The power supply 106 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The controller 108 controls the general operations of the media device 160 and can comprise any of or any combination of a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of computer-readable instructions, algorithms, or software including the software 112 stored in memory 110 for controlling the operation and functions of the media device 160 in accordance with the embodiments described in the present disclosure. Communication between any of the element (for example, elements 102, 104, 106, 110, 112, and/or 114) of the media device 160 can be established using an internal bus.

The memory 110 can comprise a single memory or one or more memories or memory locations that can include, but are not limited to, any of a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), an optical drive, a hard disk or any other various layers of memory hierarchy. The memory 110 can be used to store any type of computer-readable instructions, software, or algorithms including software 112 for controlling the general function and operations of the media device 160 in accordance with the embodiments described in the present disclosure. In one or more embodiments, software 112 includes one or more applications and/or computer-readable instructions for providing seamless transition between one or more media applications 120, such as media applications 120A through 120N (collectively referred to as media application(s) 120), where "N" represents any number of media applications 120. A media application 120 can be associated with any type of network resource 150 that provides content to a media device 160, such as any of a Netflix application, an Amazon Prime application, a Hulu application, a YouTube application, any other application associated with a provider of content, or any combination thereof.

The user interface 114 can comprise any of one or more tactile inputs (for example, a push button, a selector, a dial, a remote control unit (RCU), etc.), a camera, a keyboard, an audio input, for example, a microphone, a keypad, a liquid crystal display (LCD), a thin film transistor (TFT), a light-emitting diode (LED), a high definition (HD) or other similar display device including a display device having touch screen capabilities so as to allow an interactive experience between a user and the media device 160, or a combination thereof.

In one or more embodiments, connection 105 can be a bidirectional communication link such that any one or more communications or messages can be sent and/or received by the media device 160. A connection 105 can be a wired and/or wireless connection.

Further, the media device 160 is adapted to execute an operating system, such as Android, as well as virtual machines adapted to virtualize execution of a particular operating system, including customized and proprietary operating systems. The media device 160 can further be equipped with components to facilitate communication with other devices over the one or more network connections to local and wide area networks, wireless and wired networks, public and private networks, and any other communication network enabling communication in the media environment 100.

Figure 2:
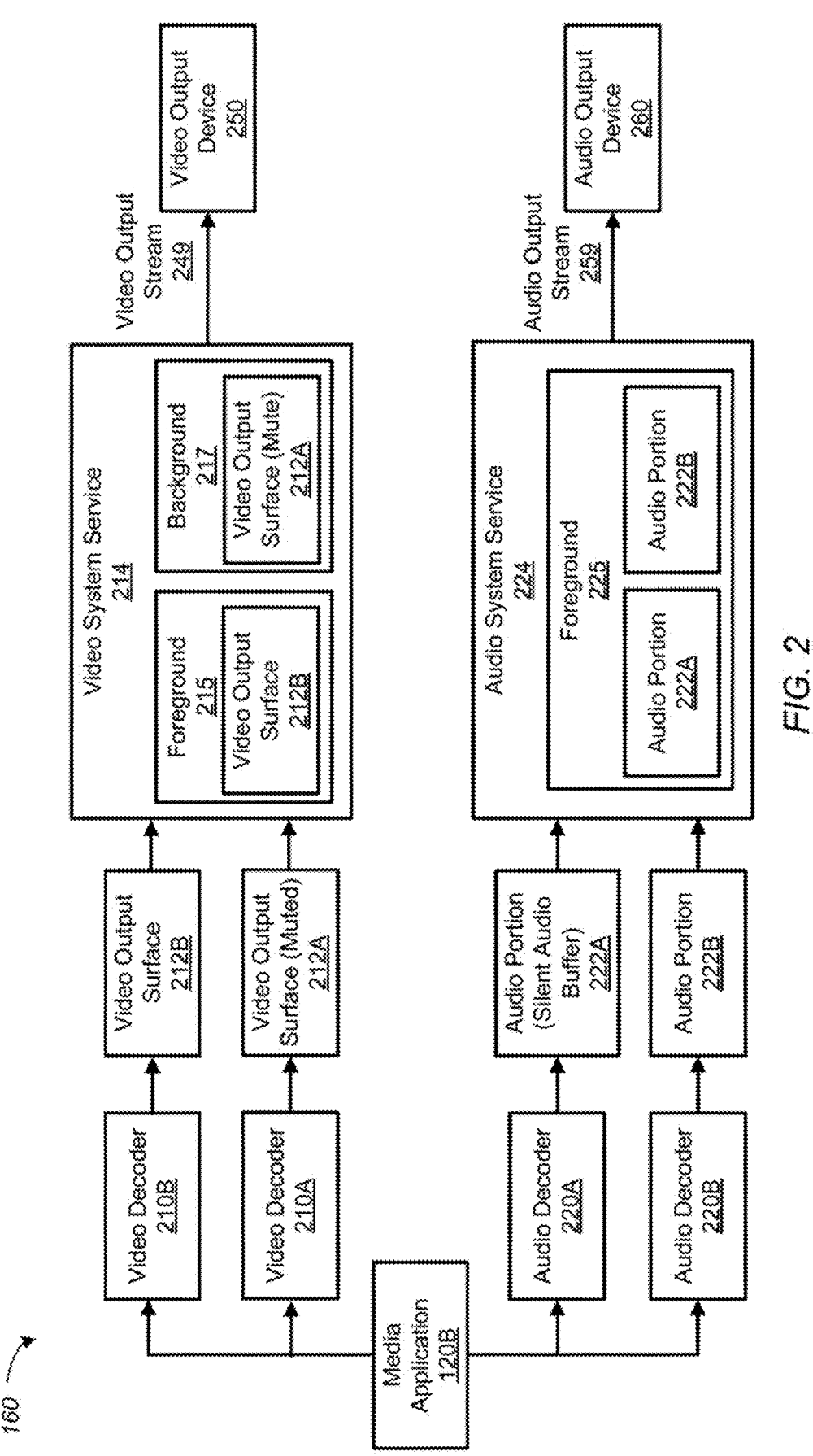
FIG. 2 is a block diagram of a seamless transition from a first media application to a second media application at a media device, according to one or more aspects of the present disclosure.

FIG. 2 is a block diagram of a seamless transition from a first media application 120A to a second media application 120B at a media device 160, according to one or more aspects of the present disclosure. In one or more embodiments, a media device 160 comprises a plurality of media applications 120, for example, a first media application 120A and a second media application 120B. The media device 160 can execute a first media application 120 so as to present a first content 170A to an output device 102 (for example, internal to the media device 160 as illustrated in FIG. 1 or externally coupled to the media device 160), such as a video output stream 249 to a video output device 250 and an audio output stream 259 to an output device 260. In one or more embodiments, the video output device 250 and the audio output device 260 can be part of a single device or distinct devices.

As an example, a media device 160, for example, with an Android operating system executes a first media application 120A of a plurality of media applications 120. The first media application 120A is associated with a first content 170A that comprises a first video portion and a first audio portion. The media device 160 receives an instruction or command to switch from the first media application 120A to a second media application 120B associated with a second content 170B. The media device 160 switches from the first media application 120A to the second media application 120B based on the command. For example, the second media application 120B sends the second content 170B to a second video decoder 210B for processing. The second video decoder 210B processes the second content 170B to generate a second output based on the second content 170B. A second video output surface 212B is generated based on the second output. A first video decoder 210A processes the first content 170A so as to generate a first output. The first video output surface 212A that is muted is based on the first output. A video system service 214 executes the second video output surface 212B in the foreground 215 while the first video output surface 212A associated with the first media application 120A that is muted is moved to the background 217. The video system service 214 outputs a video output stream 249 to the video output device 250. The video output stream 249 comprises a mix of foreground and background video streams (the video output surface 212B and the video output surface 212A, respectively) mixed by a video mixer, such as a SurfaceFlinger system component, for example, as included with Android.

The second media application 120B, at, about or simultaneously with processing of the second content 170B by the second video decoder 210B, sends the second content 170B to the second audio decoder 220B for processing. The second audio decoder 220B processes the second content 170B to generate a second audio portion or track 222B while the first audio decoder 220A associated with the first media application 120A generates a silent audio buffer as the first audio portion or track 222A. An audio system service 224 processes the first audio portion 222A and the second audio portion 222B in a foreground 225. For example, the audio system service 224 can comprise an audio mixer, such as an AudioFlinger system component, for example, as included with Android. The audio system service 224 sends an audio output stream 259 to the audio output device 260. The audio output stream 259 comprises all active audio portions or tracks mixed by the audio mixer, such as by the AudioFlinger, for example, audio portion 222A and audio portion 222B. As the first audio portion 222A comprises a silent audio buffer (for example, a buffer that comprises all zeroes), the simultaneous playback of the first audio portion 222A and the second audio portion 222B as audio output stream 259 results in only the second audio portion 222B being audible.

Figure 3:
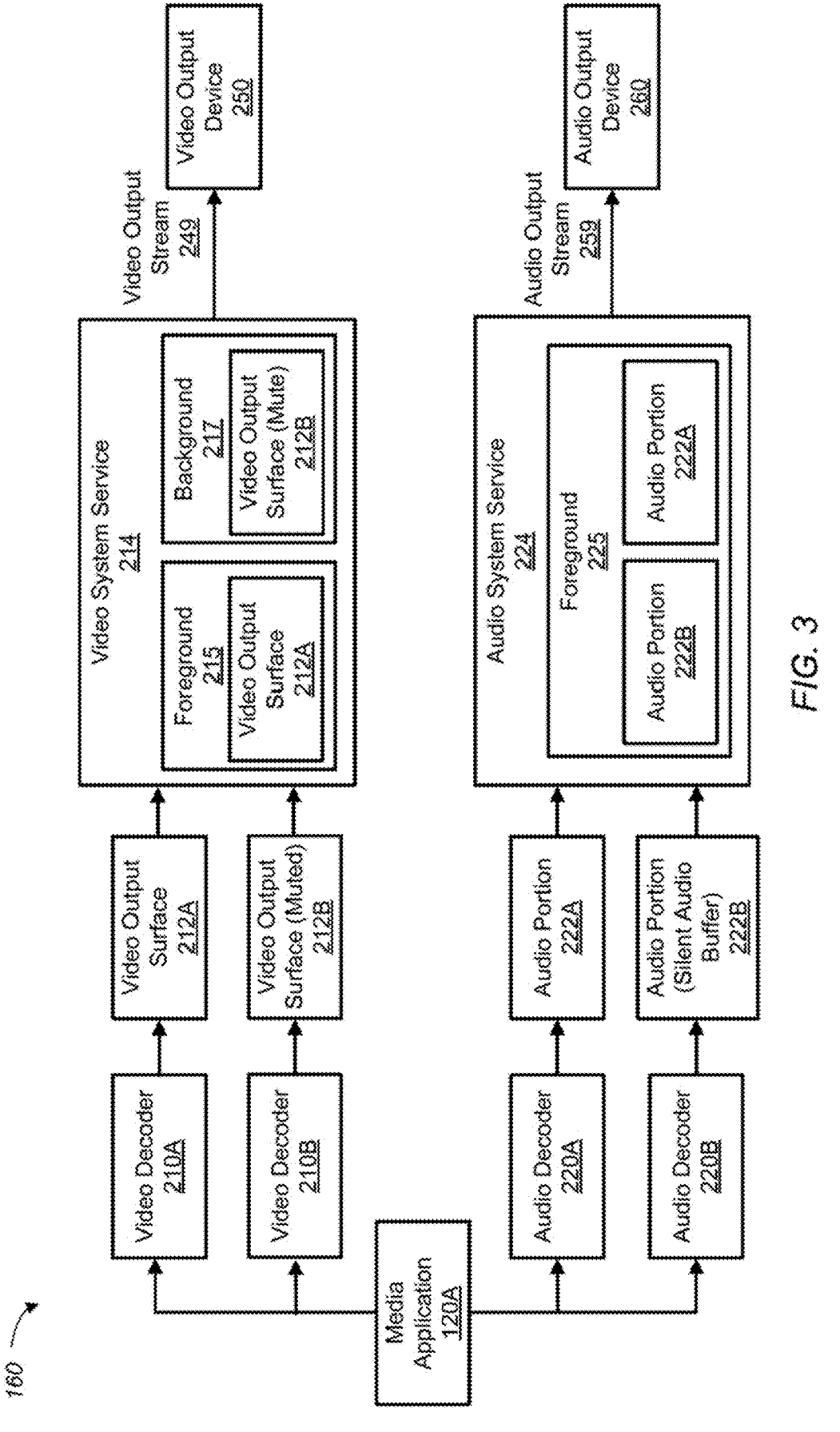
FIG. 3 is a block diagram of a seamless transition from a second media application to a first media application at a media device, according to one or more aspects of the present disclosure.

FIG. 3 is a block diagram of a seamless transition from a second media application 120B to a first media application 120A at a media device 160, according to one or more aspects of the present disclosure. In FIG. 3, the media device 160 receives an instruction or a command to switch from presentation of a second content 170B associated with the second media application 120B to the first content 170A associated with the first media application 120A. The media device 160 switches from the second media application 120B to the first media application 120A based on the command. For example, the first media application 120A sends the first content 170A to a first video decoder 210A for processing. The first video decoder 210A processes the first content 170A to generate a first video output surface 212A. A second video decoder 210B processes the second content 170B so as to generate a second output based on the second content 170B. The second video output surface 212B that is muted is based on the second output. A video system service 214 executes the first video output surface 212A in the foreground 215 while the second video output surface 212B associated with the second media application 120B is muted and moved to the background 217. The video system service 214 sends a video output stream 249 to the video output device 250. The video output stream 249 comprises a mix of foreground and background video streams (the video output surface 212A and the video output surface 212B, respectively) mixed by a video mixer, such as a SurfaceFlinger system component, for example, as included with Android.

The first media application 120A, at, about or simultaneously with processing of the first content 170A by the first video decoder 210A, sends the first content 170A to the first audio decoder 220A for processing. The first audio decoder 220A processes the first content 170A to generate a first audio portion or track 222A while the second audio decoder 220B associated with the second media application 120B generates a silent audio buffer as the second audio portion 222B. The audio system service 224 processes the first audio portion 222A and the second audio portion 222B in the foreground 225. For example, the audio system service 224 can comprise an audio mixer, such as an AudioFlinger system component, for example, as included with Android. The audio system service 224 sends an audio output stream 259 to the audio output device 260. The audio output stream comprises all active audio portions or tracks mixed by the audio mixer, such as by the AudioFlinger, for example, audio portion 222B and audio portion 222A. As the second audio portion 222B comprises a silent audio buffer (for example, a buffer that comprises all zeroes), the simultaneous playback of the first audio portion 222A and the second audio portion 222B as audio output stream 259 results in only the first audio portion 222A being audible.

As illustrated in FIGS. 1-3, one or more novel aspects of the present disclosure provides for seamless transition between media applications by muting a video output surface as well as writing a silent audio buffer for an audio portion associated with a previously executed media application. In this way, when the previous media application is selected, the transition to the content associated with the previous media application is presented without significant delay so that a user does not experience a black screen or mixed audio at the output device.

FIG. 4 illustrates a flow diagram of a method of transition between a first media application and a second media application at a media device, according to one or more aspects of the present disclosure. While the steps S402-S416 are presented in a certain order, the present disclosure contemplates that any one or more steps can be performed simultaneously, substantially simultaneously, repeatedly, in any order or not at all (omitted).

At step S402, the media device 160 receives a command to switch from the first media application 120A associated with a first content 170A to a second media application 120B associated with a second content 170B. The command can be received from an interface that allows for interactive communications with a user, for example, a remote control. In response to receiving the command to switch, the media device 160 can switch from the first media application 120A to the second media application 120B by performing one or more of the following steps S404-S416 based on the command.

At step S404, the media device 160 generates a second video output surface 212B based on the second content 170B associated with the second media application 120B. As an example, the media device 160 can send the second content 170B to a second video decoder 210B associated with a second media application 120B. The second video decoder 210B can generate or output a second output based on the second content 170B. The second video output surface 212B is generated based on the second output.

At step S406, the media device 160 generates a silent audio buffer based on the first content 170A. For example, the media device 160 can send the first content to a first audio decoder 220A associated with the first media application 120A. The first audio decoder 220A can generate the audio portion 222A that comprises the first silent audio buffer based on the first content. The generating first silent audio buffer can comprise the first audio decoder 220A writing one or more zeroes to a buffer associated with the first content 170A.

At step S408, the media device 160 generates a second audio portion 222B based on the second content 170B. As an example, the media device 160 can send the second content 170B to a second audio decoder 220B. The second audio decoder 220B can generate the second audio portion 222B based on the second content 170B.

At step S410, the media device 160 processes the second video output surface 212B in a video system service foreground and the first video output surface 212A as muted in a video system service background. In this way, the second video output surface 212B is executed in the foreground while the first video output surface 212A is executed in the background. For example, the first video decoder 210A can apply a mute to the first content 170A, such as apply mute to the first video output surface 212A, so as to generate the muted first video output surface 212A.

At step S412, the media device 160 processes the second audio portion 222B and the silent audio buffer associated with the first audio portion 222A in an audio system service foreground. In this way, the first audio portion 222A and the second audio portion 222B are executed in the foreground but as the first audio portion 222A is muted (as the silent audio buffer), only the second audio portion 222B is audible.

At step S414, the media device 160 sends a video output stream 249 to a video output device 250. The video output stream 249 is based on the processed second video output surface 212B and the muted first video output surface 212A.

At step S416, the media device 160 sends an audio output stream 259 to an audio output device 260. The audio output stream 259 is based on the processed second audio portion 222B and the silent audio buffer.

According to some example embodiments of inventive concepts disclosed herein, there are provided novel solutions for providing a seamless transition between media applications at a media device. The novel solutions provide a significant improvement over traditional solutions as the seamless switching allows for the presentation of content without presentation of a black screen for extended periods of time or mixed audio portions. By providing such enhanced seamless transition between media applications, the QoE of a user is improved by providing user-selected content without significant delay or audio/visual issues.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A media device for switching from a first media application to a second media application based on a command, comprising:

a memory storing one or more computer-readable instructions; and a processor configured to execute the one or more computer-readable instructions to perform one or more operations to:

receive the command to switch from the first media application associated with a first content to the second media application associated with a second content, the first content including a first video output surface; and switch from the first media application to the second media application based on the command, wherein the switching comprises:

generating a second video output surface based on the second content;

generating a silent audio buffer based on the first content;

generating a second audio portion based on the second content;

processing the second video output surface in a video system service foreground and the first video output surface as muted in a video system service background;

processing the second audio portion and the silent audio buffer in an audio system service foreground;

sending a video output stream to a video output device, wherein the video output stream is based on the processed second video output surface and the muted first video output surface; and sending an audio output stream to an audio output device, wherein the audio output stream is based on the processed second audio portion and the silent audio buffer.

2. The media device of claim 1, wherein the switching further comprises:

sending the second content to a second video decoder associated with the second media application, wherein the second video decoder outputs a second output based on the second content; and generating the second video output surface based on the second output of the second video decoder.

3. The media device of claim 1, wherein the switching further comprises:

sending the second content to a second audio decoder associated with the second media application, wherein the second audio decoder generates the second audio portion based on the second content.

4. The media device of claim 1, wherein the switching further comprises:

sending the first content to a first audio decoder associated with the first media application, wherein the first audio decoder generates the silent audio buffer based on the first content.

5. The media device of claim 1, wherein processing the second video output surface in a video system service foreground and the first video output surface as muted in a video system service background comprises:

applying mute to the first video output surface to generate the muted first video output surface.

6. The media device of claim 1, wherein generating the silent audio buffer comprises writing one or more zeroes to a buffer associated with the first content.

7. The media device of claim 1, wherein the silent audio buffer is generated by a first audio decoder associated with the first media application.

8. A method for a media device to switch from a first media application to a second media application, the method comprising:

receiving the command to switch from the first media application associated with a first content to the second media application associated with a second content, the first content including a first video output surface; and switching from the first media application to the second media application based on the command, wherein the switching comprises:

generating a second video output surface based on the second content;

generating a silent audio buffer based on the first content;

generating a second audio portion based on the second content;

processing the second video output surface in a video system service foreground and the first video output surface as muted in a video system service background;

processing the second audio portion and the silent audio buffer in an audio system service foreground;

sending a video output stream to a video output device, wherein the video output stream is based on the processed second video output surface and the muted first video output surface; and sending an audio output stream to an audio output device, wherein the audio output stream is based on the processed second audio portion and the silent audio buffer.

9. The method of claim 8, wherein the switching further comprises:

sending the second content to a second video decoder associated with the second media application, wherein the second video decoder outputs a second output based on the second content; and generating the second video output surface based on the second output of the second video decoder.

10. The method of claim 8, wherein the switching further comprises sending the second content to a second audio decoder associated with the second media application, wherein the second audio decoder generates the second audio portion based on the second content.

11. The method of claim 8, wherein the switching further comprises:

sending the first content to a first audio decoder associated with the first media application, wherein the first audio decoder generates the silent audio buffer based on the first content.

12. The method of claim 8, wherein processing the second video output surface in a video system service foreground and the first video output surface as muted in a video system service background comprises:

applying mute to the first video output surface to generate the muted first video output surface.

13. The method of claim 8, wherein generating the silent audio buffer comprises writing one or more zeroes to a buffer associated with the first content.

14. The method of claim 8, wherein the silent audio buffer is generated by a first audio decoder associated with the first media application.

15. A non-transitory computer-readable medium of a media device storing one or more instructions for providing switching from a first media application to a second media application, which when executed by a processor of the media device, cause the media device to perform one or more operations comprising:

receiving the command to switch from the first media application associated with a first content to the second media application associated with a second content, the first content including a first video output surface; and switching from the first media application to the second media application based on the command, wherein the switching comprises:

generating a second video output surface based on the second content;

generating a silent audio buffer based on the first content;

generating a second audio portion based on the second content;

processing the second video output surface in a video system service foreground and the first video output surface as muted in a video system service background;

processing the second audio portion and the silent audio buffer in an audio system service foreground;

sending a video output stream to a video output device, wherein the video output stream is based on the processed second video output surface and the muted first video output surface; and sending an audio output stream to an audio output device, wherein the audio output stream is based on the processed second audio portion and the silent audio buffer.

16. The non-transitory computer-readable medium of claim 15, wherein the switching further comprises:

sending the second content to a second video decoder associated with the second media application, wherein the second video decoder outputs a second output based on the second content; and generating the second video output surface based on the second output of the second video decoder.

17. The non-transitory computer-readable medium of claim 15, wherein the switching further comprises at least one of:

sending the second content to a second audio decoder associated with the second media application, wherein the second audio decoder generates the second audio portion based on the second content; and sending the first content to a first audio decoder associated with the first media application, wherein the first audio decoder generates the silent audio buffer based on the first content.

18. The non-transitory computer-readable medium of claim 15, wherein processing the second video output surface in a video system service foreground and the first video output surface as muted in a video system service background comprises:

applying mute to the first video output surface to generate the muted first video output surface.

19. The non-transitory computer-readable medium of claim 15, wherein generating the silent audio buffer comprises writing one or more zeroes to a buffer associated with the first content.

20. The non-transitory computer-readable medium of claim 15, wherein the silent audio buffer is generated by a first audio decoder associated with the first media application.

* * * * *